Patented May 8, 1951

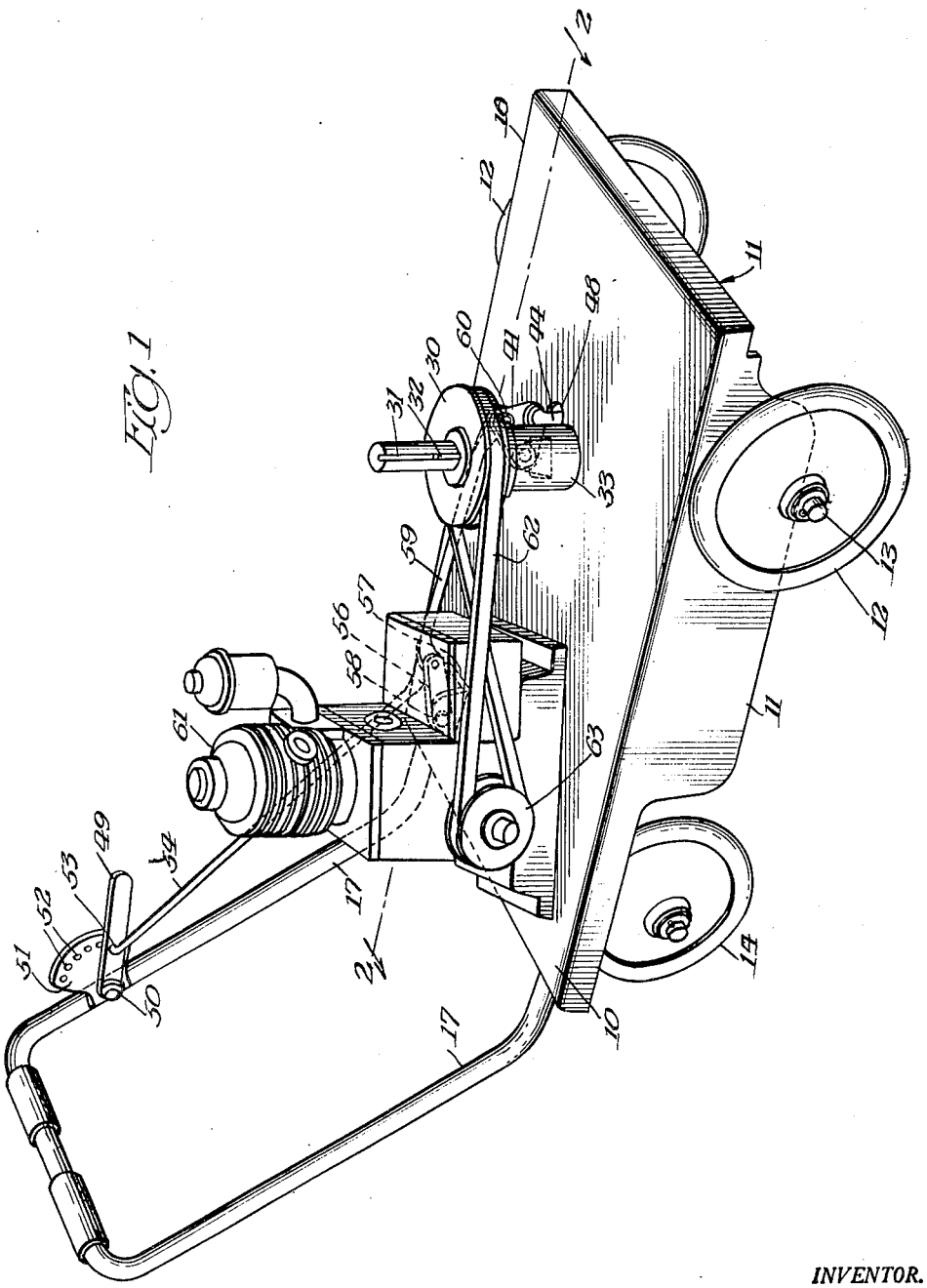

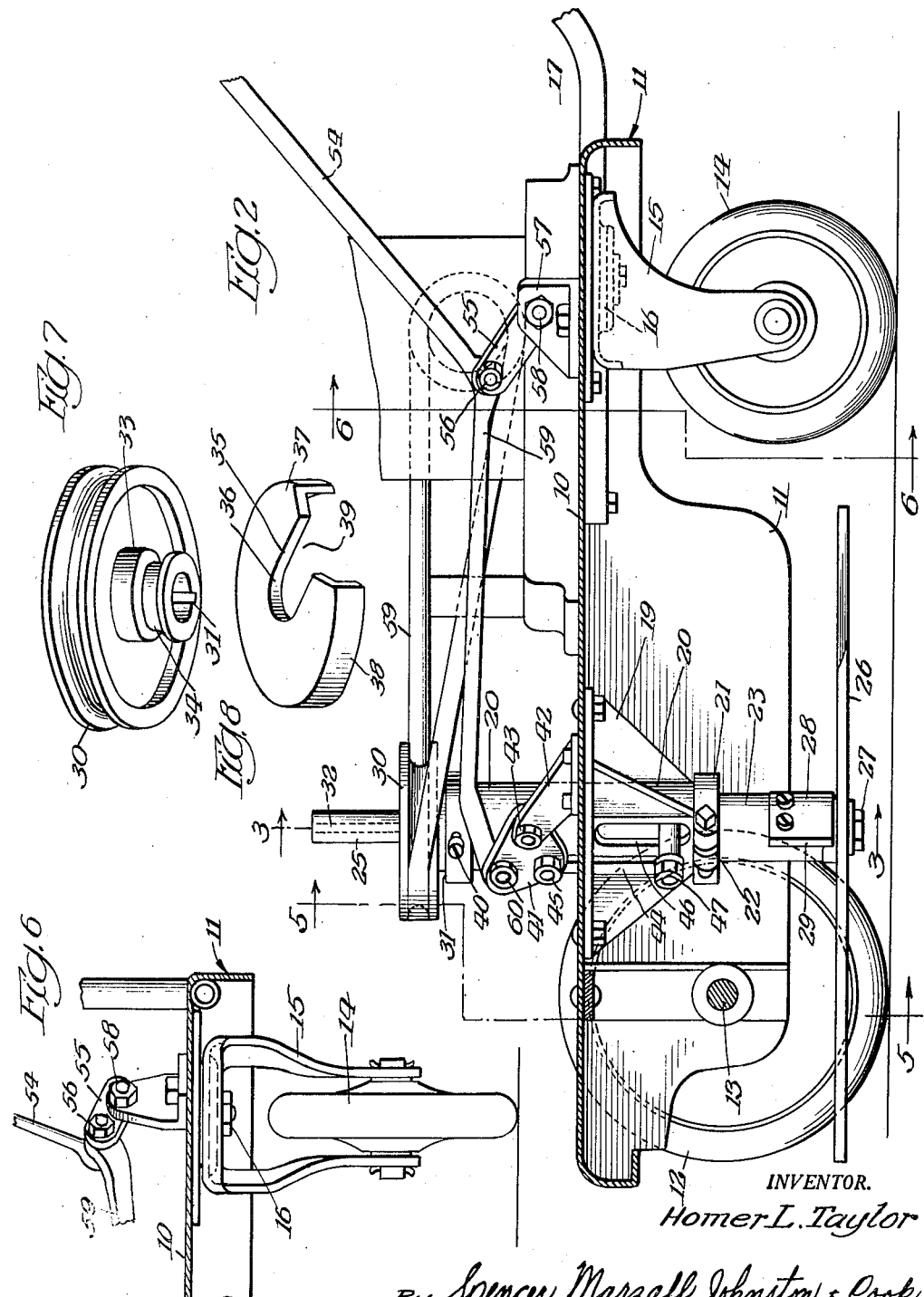

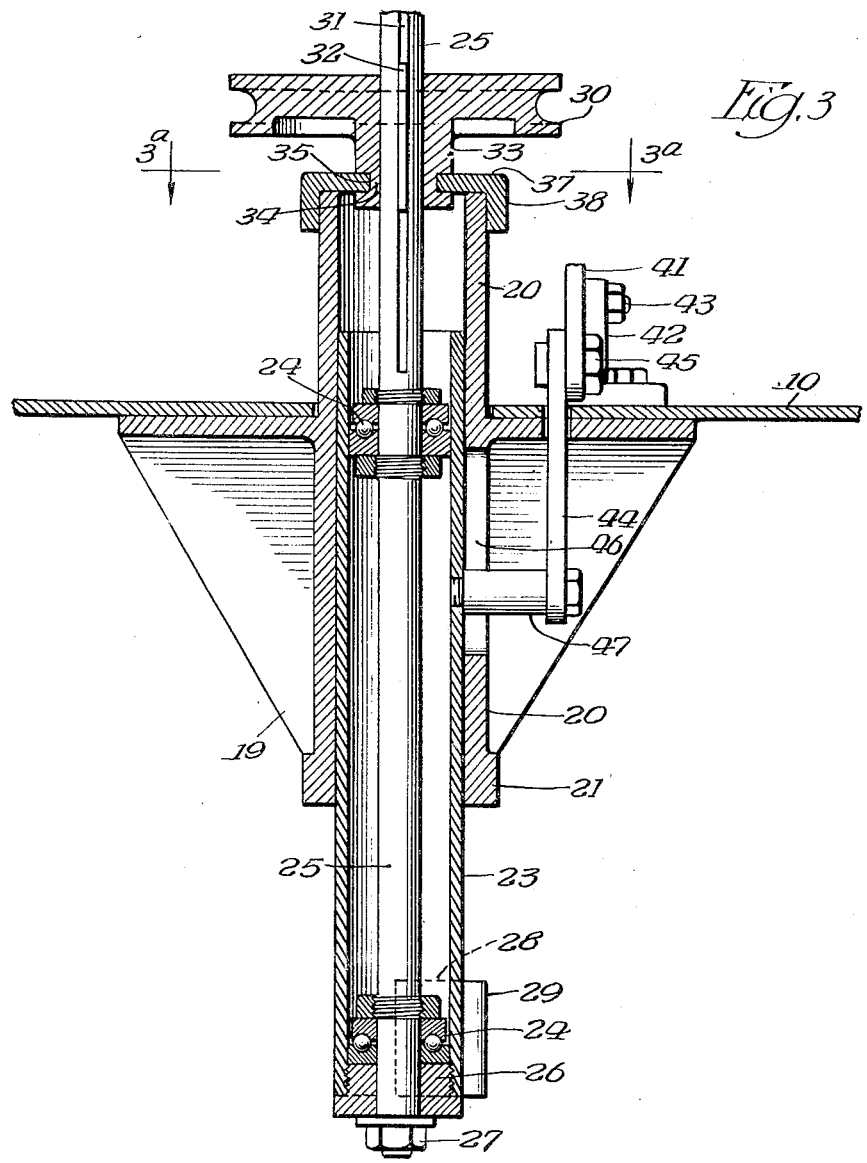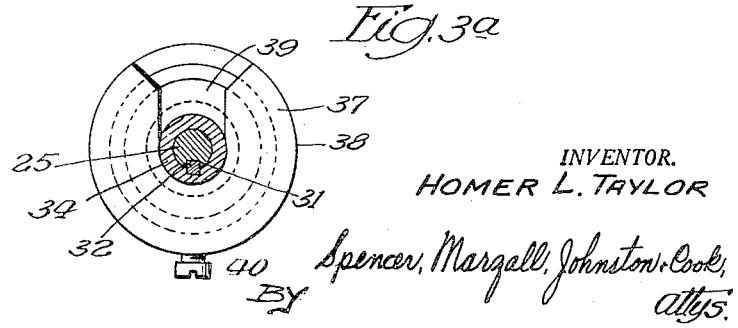

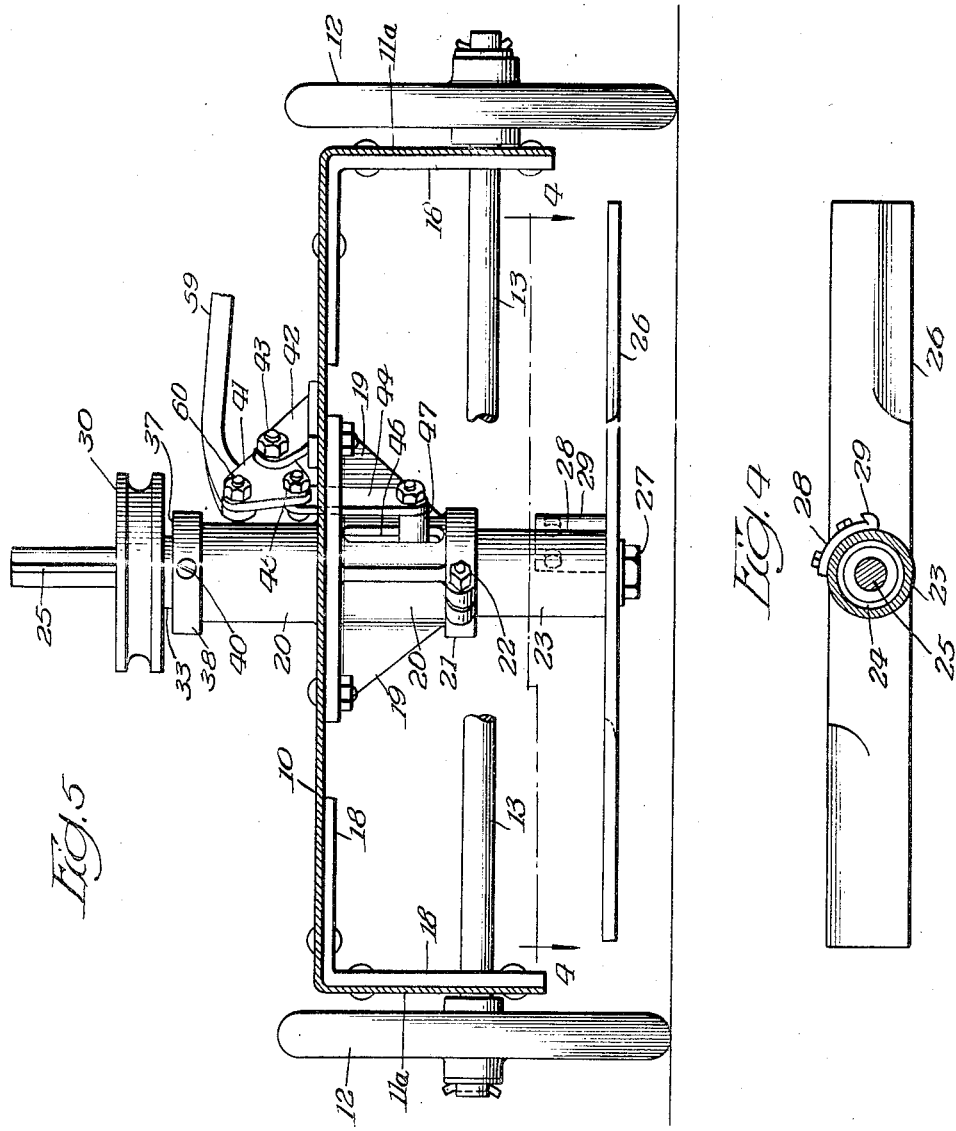

2,551,817

UNITED STATES PATENT OFFICE 2,551,817

ROTATING CUTTING-DISK TYPE MOWER

Homer L. Taylor, Terre Haute, Ind.

Application December 3, 1945, Serial No. 632,304

4 Claims. (Cl. 56—255)

This invention relates to improvements in grass and weed cutters, of the type embodying a wheel supported body or platform, provided with a vertical shaft extending therethrough, the shaft being driven by a motor mounted upon the platform, and a rotary blade or cutter below the platform and connected to the lower end of the shaft.

One of the objects of the present invention is to improve and simplify the construction of such a cutter, and to provide improved means for vertically adjusting the cutter blade to raise or lower the same.

A further object is to provide improved means embodying a remote control for effecting such adjustment, which control is preferably located adjacent the propelling handle of the machine, whereby the operator may, from a remote point, readily and expeditiously position the cutter blade at any desired distance above the ground.

A still further object is to provide an improved wheel supported machine of this character, in which certain of the wheels are of the caster type, thereby facilitating the ease with which the machine may be readily guided and manipulated.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawings exemplifying this invention, and in which Figure 1 is a perspective view of a device of this character, constructed in accordance with the principles of this invention.

Figure 2 is a sectional view taken on line 2—2, Figure 1.

Figure 3 is a detail sectional view taken on line 3—3 of Figure 2, on an enlarged scale.

Figure 3a is a sectional view on line 3a—3a, Figure 3.

Figure 4 is a detail sectional view taken on line 4—4, Figure 5.

Figure 5 is a sectional view taken on line 5—5, Figure 2.

Figure 6 is a sectional view taken on line 6—6, Figure 2.

Figure 7 is a detail perspective view of the drive pulley for the cutter blade shaft.

Figure 8 is a detail perspective view of the cap or collar for holding in position the pulley that drives the cutter blade.

Referring more particularly to the drawings, the numeral 10 designates a platform or support of any desirable size and configuration, and constructed of any suitable material, and is provided with a continuous downwardly extending marginal apron or flange 11 having downward extensions 11a at the sides of the platform. The platform is supported at its front by wheels 12, journaled upon an axle 13, suitably mounted, and these wheels extend from side to side of the platform, being mounted in the sides 11 thereof. The platform is provided, at its rear end, with caster wheels 14, the brackets or bearings 15 of which are swiveled to the platform, as at 16, so that the machine may be readily guided, preferably by means of a handle 17, connected to the platform.

The support and bearings for the axle 13 of the front wheels 12 may be formed in any suitable manner, such as by means of a bent bar or bracket 18, the arms of which may reinforce the sides or flanges 11 of the platform.

Mounted upon the platform, and supported by means of a suitable bracket or bearing 19, is a tubular member 20, which extends through the platform to terminate any desired distance above and below the platform, and at a suitable distance above the ground. This bracket 19 is preferably split, and is provided with a clamping collar 21 at its lower end, and is drawn together in clamping position by a suitable fastening element 22.

Slidably mounted in the tubular member 20, is another tube or tubular member 23, which is of a length to project for a substantial distance below the member 20, and journaled in this tubular member 23, preferably in ball bearings 24, is a shaft 25, which is of a length to project beyond the upper end of the tubular members 20 and 23. At the lower end of the shaft 25, and beyond the adjacent end of the tubular member 23, is secured a cutter, preferably in the form of a knife blade 26, by means of a suitable fastening device 27.

Also adjacent the lower end of the tubular member 23, and adjacent the axis of rotation of the knife or blade 26, is a cutter 28 (see Figure 4), having a cutting edge 29 that operates, when the cutter 26 is rotating, to cut or remove any weeds or matter that would otherwise become entangled about the axis of the knife blade 26.

A drive pulley 30 is keyed to the upper end of the shaft 25, and is provided with a key or rib 31 that is slidable in a key-way or groove 32 in the shaft. The hub 33 of the pulley is provided with an annular groove 34, to receive the edges 35 of a slot 36 in a cap member 37, and which slot has an open end 39. This slot is of a size to pass over the hub 33 of the pulley 30, to permit the edges 35 of the slot 36 to enter the groove 34 of the hub 33, and thereby hold the pulley in position for rotation at the end of the tubular member 20, when the cap is placed upon the end of such tubular member.

With this construction, when the pulley 30 is rotated, the shaft 25 and knife blade 26 will also be rotated, and, at the same time, as the pulley 30 is keyed to the shaft 25, it will be manifest that the shaft may be given a longitudinal adjustment or movement through the pulley, without interfering with the rotation of either. The cap 37 may be secured to the tubular member 20 in any suitable manner, such as by means of a fastening screw 40.

To effect a longitudinal sliding movement or vertical adjustment of the tubular member 23, and the shaft 25, together with the cutter or knife blade 26, from a remote point, there is provided a bell crank lever 41, pivotally mounted upon a fulcrum support 42, as at 43. A link 44 is pivotally connected by one end, as at 45, to the lever 41, the link being disposed outside of the tubular member 20; and is pivotally connected, at its other end, to the sliding tubular member 23, through a slot 46 in the tubular member 20, by means of a pin or fastening device 47. The slot 46 is of a substantial length, to permit of longitudinal movement of the tubular member 23, and the link 44 passes through an opening 48 in the platform or support 10. Any suitable remote control device may be provided, but it preferably embodies a handle or lever 49, pivotally mounted, as at 50, upon the handle 17 of the machine, to co-operate with a segment 51, preferably provided with openings 52, with which a pin or lug on the handle 49 co-operates. The handle 49 is adapted to be sprung sidewise from its pivot 50, to move the lug into or out of the openings 52, and thereby release the handle for movement about its pivot, or to hold the same locked in its adjusted position, and thereby retain the bellcrank lever 41 and the knife blade, through the intermediate connections, in adjusted position.

A link 54 having one end thereof pivotally connected to one end of a second link 55 which has its other end pivotally connected to a fulcrum support 57 is also connected to the lever 49 at a point medially of its end, the pivotal connection for the link 54 consisting of a laterally turned end 53 which projects through the medial regions of the handle 49.

Another link 59 is pivotally connected, by one end, to the link 55, by the pivot 56, and the other end of the link 59 is pivotally connected to the bell crank lever 41, as at 60. Thus, when the handle 49 is moved about its pivot 50, the bell crank lever 41 will be rocked about its pivot 43, to effect an adjustment of the knife blade or knife 26, through the medium of the intermediate connecting mechanisms. When the desired adjustment of the knife is obtained, the parts may be locked in such position by means of the co-operating locking means between the handle 49 and segment 51.

The knife or blade 26 is rotated in any suitable manner, such as by a motor 61, mounted upon the platform 10, through the medium of a driving belt 62 that passes over a pulley 63 on the motor shaft, and also over the pulley 30.

Thus, it will be seen that there is provided a simple and effective device for cutting weeds and the like, which is easy to manipulate, and one in which the cutter blade may be quickly and readily adjusted from a remote point on the machine, without stopping the operation of the machine, or even the motor which drives the cutter blade or knife.

While the preferred form of the invention has been herein shown and described, it is to be understood that various changes may be made in the details of construction, and in the combination and arrangement of the several parts, within the scope of the claims, without departing from the spirit of this invention.

What is claimed as new is:

1. A machine of the character described, embodying a wheel supported platform, a handle connected to the platform, a tubular upright member mounted upon and extending through the platform, a tubular member slidable in the first said tubular member, a shaft journaled in the second said tubular member, a knife blade connected to the end of the shaft, to be actuated thereby, means at the other end of the shaft for rotating it, and means providing a vertical adjustment of the second said tubular member and the said shaft may be effected in the first said tubular member, to effect a vertical adjustment of said knife blade with respect to said platform, said last named means including a member positioned below the platform and extending through the tubular upright, and linkage above the platform and connected to the last named member and to the handle for effecting vertical adjustment of the tubular member.

2. A grass cutter comprising a platform, a flange extending downwardly on each side and end of the platform, a transverse front axle carried by the platform, wheels mounted on said axle outside of said flange, caster wheels mounted at the rear end of said platform and arranged interiorly of said side flanges and forwardly of the rear flange, a handle connected to said platform, a tubular member carried by the platform and extending above and below the platform, a tube in said tubular member, a shaft journaled in the tube for rotation therein, a knife blade on said shaft, a pin passing through a slot in the tubular member and fastened to the tube, an arm pivoted to the pin, an operating member on the handle, and linkage connecting the arm and operating member to raise and lower the tube and consequently the cutter.

3. A grass cutter comprising a platform, a flange extending downwardly on each side and end of the platform, a transverse front axle carried by the platform, wheels mounted on said axle outside of said flange, caster wheels mounted at the rear end of said platform and arranged interiorly of said side flanges and forwardly of the rear flange, a handle connected to said platform, a tubular member carried by the platform and extending above and below the platform, a tube in said tubular member, a shaft journaled in the tube for rotation therein, a knife blade on said shaft, a pin passing through a slot in the tubular member and fastened to the tube, an arm pivoted to the pin, an operating member on the handle, and linkage connecting the arm and operating member to raise and lower the tube and consequently the knife blade, and a cutter arranged intermediate the ends of the knife blade and adjacent the shaft.

4. A grass cutter comprising a supporting platform, wheels secured to the platform, means for supporting a handle on the platform, a tubular member secured to the platform and extending a predetermined distance above and below the top of the platform, a tube slidably mounted in said tubular member, a shaft concentrically and rotatably mounted in the tube, means at the upper end of the tubular member and fastened to the shaft for rotating the shaft, a knife blade at the lower end of the tube, said tubular member having a slot formed therein below the platform, a member extending through said slot and connected to the tube, an arm connected to said last named member and extending through the platform, linkage means mounted on said handle and connected to said arm for effecting a vertical adjustment of the tube and consequently the cutter.

HOMER L. TAYLOR.

REFERENCES CITED

The following references are of record in the file of this patent:

UNITED STATES PATENTS

| Number | Name | Date |
| --- | --- | --- |
| 1,823,215 | Seal | Sept. 15, 1931 |
| 2,243,133 | Steiner et al. | May 27, 1941 |
| 2,245,821 | Poynter | June 17, 1941 |
| 2,329,185 | Coddington | Sept. 14, 1943 |

FOREIGN PATENTS

| Number | Country | Date |
| --- | --- | --- |
| 113,299 | Switzerland | May 17, 1926 |